US005862025A

United States Patent [19]

Lang et al.

[11] Patent Number: 5,862,025

[45] Date of Patent: Jan. 19, 1999

[54] VISUAL DISK-CAPACITY INDICATOR FOR DISK RECORDING SYSTEMS

[75] Inventors: Michael S. Lang, Reston, Va.; Louis H. Weiss, New York, N.Y.

[73] Assignees: Sony Corporation, Tokyo, Japan; Sony Electronics Inc., N.J.

[21] Appl. No.: 778,604

[22] Filed: Jan. 6, 1997

[51] Int. Cl.$^{6}$ .................................................... G11B 23/03

[52] U.S. Cl. .............................................................. 360/133

[58] Field of Search .................................... 360/133, 132, 360/137; 369/291

[56] References Cited

U.S. PATENT DOCUMENTS 4,590,532 5/1986 Saito ....................................... 360/133

FOREIGN PATENT DOCUMENTS 2101794 1/1983 United Kingdom ................... 360/133

*Primary Examiner*—Allen T. Cao

*Attorney, Agent, or Firm*—Jay H. Maioli

[57] ABSTRACT

A visual disk-capacity indicator for indicating to a user an approximate amount of disk space available for recording data on a floppy disk is located proximate a peripheral edge of a cartridge housing the floppy disk. The visual disk-capacity indicator includes a transparent window that provides visual access to an indicator needle. The window includes indicia showing various capacity levels ranging from empty to full. The indicator needle has a first end slidably engaged with a first guide rail and a second end slidably engaged with a second guide rail to maintain a longitudinal axis of the indicator needle in a parallel relation with the indicia. An access opening at the peripheral edge of the cartridge proximate the visual disk-capacity indicator allows a small external arm to enter the cartridge to adjust the indicator needle. The indicator needle may also be adjusted by magnetic member.

6 Claims, 4 Drawing Sheets

18
26
22
10
4
4
14
EMPTY
FULL
12
16
20
24
26

16
12
4
22
26

S2
CAPACITY INDICATOR PRESENT ?
NO
END
YES
S4
READ INDICATOR
S6
DETERMINE TRUE CAPACITY
S8
COMPARE INDICATOR VALUE WITH TRUE CAPACITY
S10
DIFFERENCE < 10% OF MAXIMUM DISKETTE CAPACITY ?
NO
DISPLAY WARNING AND PROMT FOR INPUT
YES
RECORD/ERASE INFORMATION ON DISKETTE?
NO
CONTINUE USING DISKETTE
S12
YES
RECORD/ERASE INFORMATION AND UPDATE INDICATOR
S14

VISUAL DISK-CAPACITY INDICATOR FOR DISK RECORDING SYSTEMS

BACKGROUND

The present invention relates generally to a floppy disk cartridge. More particularly, the present invention relates to a floppy disk cartridge having a visual disk-capacity indicator for indicating an amount of disk space available for recording on an attached floppy disk recording medium.

With the widespread use of computers in the "information Age" currently taking place, floppy disks have become common devices for storing data to and from computers. Floppy disks are generally small in size, lightweight, reasonably inexpensive, and can store well over 1 Mbyte of information on each disk. Floppy disks are also easily transferred from one computer to another, and therefore are a convenient means to transfer data between various computers without requiring a network system or a modem device.

One of the most common types of floppy disks is the so-called 3.5-inch floppy disk. A perspective view of a typical 3.5-inch floppy disk 1 is shown in FIG. 1. A disk-shaped recording medium 2 is housed in a rigid cartridge 3 that provides reasonable protection from inadvertent physical damage. The cartridge 3 is formed of an upper half 31 and a lower half 32 and includes a sliding cover plate 6 that selectively covers an aperture 5 in the upper half 31 of the cartridge 3 for accessing an upper side of the recording medium 2 housed therein. The cover plate 6 provides limited access to the recording medium 2 housed in the cartridge 3. A spring mechanism 7 biases the cover plate 6 to a normally closed position covering the aperture 5. When the floppy disk cartridge is inserted into a disk drive unit, the cover plate 6 is moved to expose the aperture 5 and a portion of the recording medium 2.

In order to determine how much disk space is available for recording in a typical floppy disk, such as that shown in FIG. 1, a user must insert the floppy disk into the disk drive of a computer and then input commands instructing the computer to electronically access the recording medium in the floppy disk to retrieve information on the amount of disk space available for recording data. The computer responds by displaying the information on a display monitor.

OBJECTS AND SUMMARY OF THE INVENTION

A feature lacking in typical floppy disks is a visual disk-capacity indicator for enabling a user to easily ascertain how much disk space has been used and how much empty disk space remains available for storing data. Such a disk-capacity indicator would allow the user to visually check whether there is enough room available to store a particular data file without having to electronically access the recording medium of the floppy disk to retrieve capacity information stored thereon, which can take a considerable amount of time depending on how many floppy disks the user must check before one is found that has adequate disk space available. Such a disk-capacity indicator would also save the user from wasting time trying to store the data file onto a floppy disk only to receive a message that the floppy disk does not have sufficient empty disk space.

In view of the above-mentioned deficiencies in typical floppy disks, it is an object of the present invention to provide a visual disk-capacity indicator for a disk recording system, in which the disk-capacity indicator visually indicates to a user approximately how much empty disk space is available on an attached recording disk.

It is another object of the present invention to provide a visual disk-capacity indicator for a floppy disk cartridge containing a floppy disk recording medium, in which the disk-capacity indicator visually indicates to a user approximately how much empty disk space is available on the attached floppy disk recording medium.

It is another object of the present invention to provide a disk-capacity indicator that mechanically moves to indicate approximately how much empty disk space is available on an attached disk.

According to an aspect of the present invention, a disk recording medium is housed in a cartridge having a disk-capacity indicator located at a peripheral region thereof to minimize interference of the disk-capacity indicator with regular operation of the disk recording medium. The disk-capacity indicator is easily visible through a window in the cartridge so that a user can easily assess an approximate amount of empty disk space available on the disk recording medium. An arm from a disk drive unit extends into the cartridge through an opening in the cartridge and moves the disk-capacity indicator to a position that reflects the amount of available disk space remaining on the disk recording medium.

According to another aspect of the present invention, an magnetic means is used to move the disk-capacity indicator.

According to yet another aspect of the present invention, when a user inserts a floppy disk cartridge containing a disk recording medium into a disk drive of a computer in order to record/erase data or reproduce data, the computer determines whether a disk-capacity indicator is present. If it is determined that a disk-capacity indicator is present, the computer reads the disk-capacity indicator and also electronically accesses the recording medium to find its true capacity. If the difference between the indicated capacity and the true capacity is less than 10%, the computer performs an operation of recording/erasing data according to the user's instructions, and then the disk drive adjusts the disk-capacity indicator to reflect the current amount of disk space available on the recording medium.

DETAILED DESCRIPTION OF PREFERRED EMBODIMENTS

Figure 1:
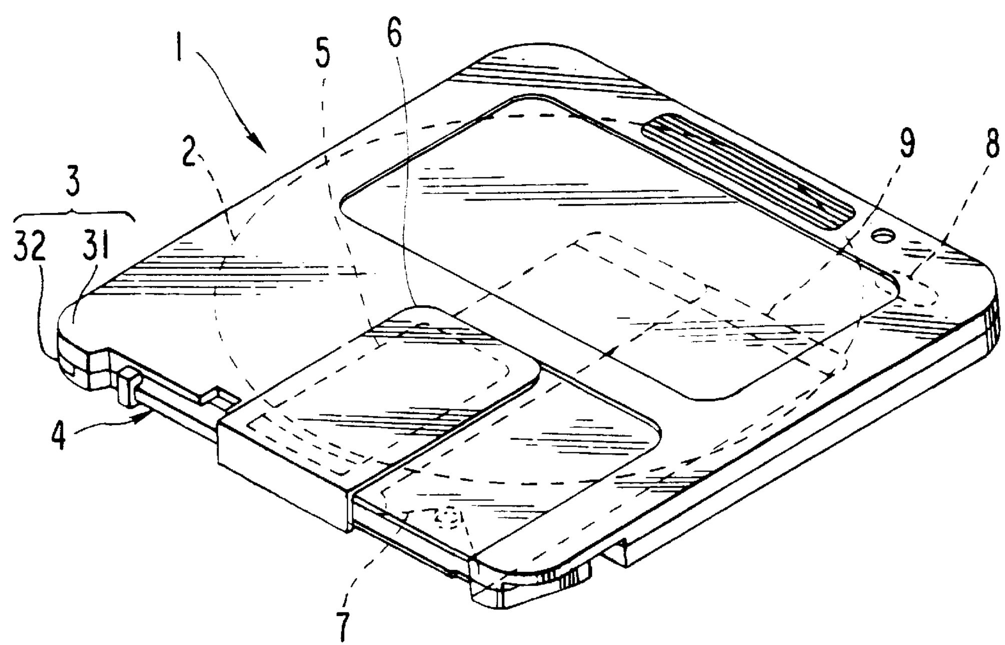
FIG. 1 is a perspective view of a typical 3.5-inch floppy disk cartridge.

A preferred embodiment of a visual disk-capacity indicator for a disk recording system according to the present invention is described below with reference to the accompanying drawings, in which like reference numerals represent the same or similar elements.

Figure 2:
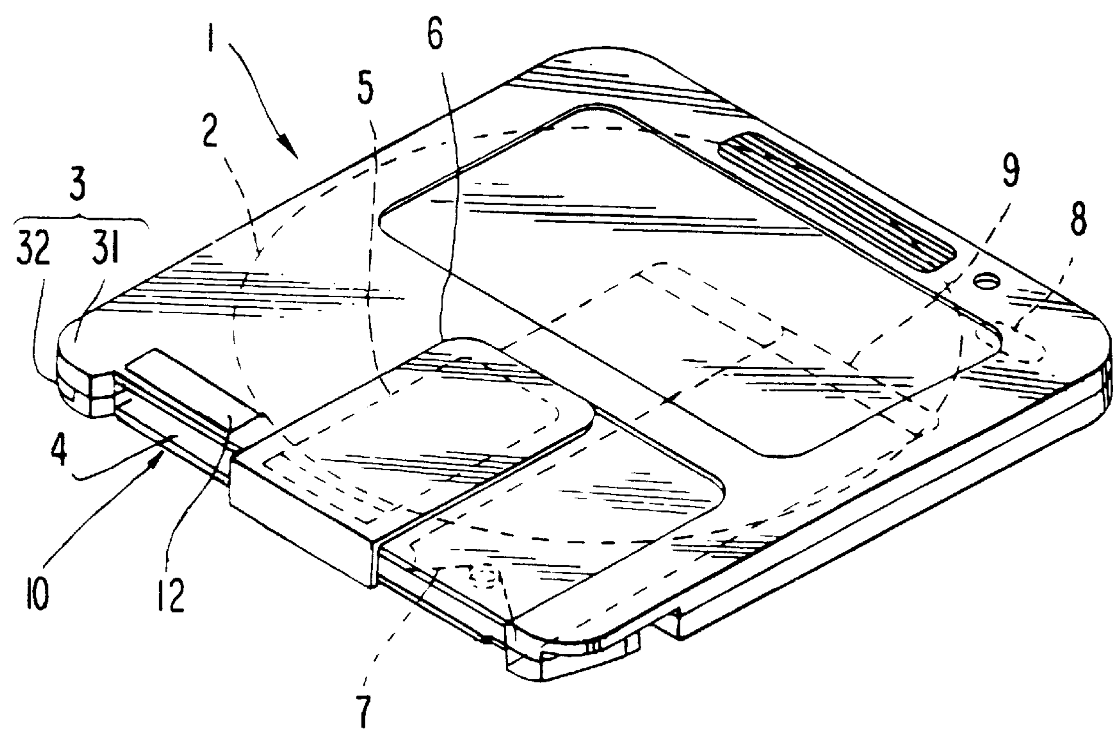
FIG. 2 is a perspective view of a floppy disk cartridge according to an embodiment of the present invention.

FIG. 2 is a perspective view of a floppy disk 1 according to an embodiment of the present invention. A disk-shaped recording medium 2 is housed in a rigid cartridge 3 formed of an upper half 31 and a lower half 32. A sliding cover plate 6 located towards a peripheral edge of the cartridge 3 selectively covers an aperture 5 formed in the upper half 31 of the cartridge 3 for accessing an upper side of the recording medium 2 housed therein. For double-sided recording media, the cover plate 6 may also be used to cover an aperture (not shown) formed in the lower half 32 of the cartridge 3 for accessing a lower side of the recording medium 2.

The cover plate 6 provides limited access to the recording medium 2 housed in the cartridge 3. A spring mechanism 7 located on one side of the cover plate 6 biases the cover plate 6 to a normally closed position covering the aperture 5. When the floppy disk 1 is inserted into a disk drive unit, the cover plate 6 is moved towards the spring mechanism 7 to expose the aperture 5 and a portion of the recording medium 2 beneath the aperture 5 so that the recording medium 2 can be accessed by a read/write head of the disk drive unit.

The floppy disk 3 also includes a visual disk-capacity indicator 10 for indicating to a user an approximate amount of disk space available for recording data on the recording medium 2. The disk-capacity indicator 10 is located towards the peripheral edge of the cartridge 3 where the cover plate 6 is located on a side of the cover plate 6 opposite to the spring mechanism 7. An access opening 4 at the peripheral edge of the cartridge 3 where the cover plate 6 is located and proximate the disk-capacity indicator 10 allows a small external arm (not shown) to enter the cartridge 3 to adjust the disk-capacity indicator 10.

Figure 3:
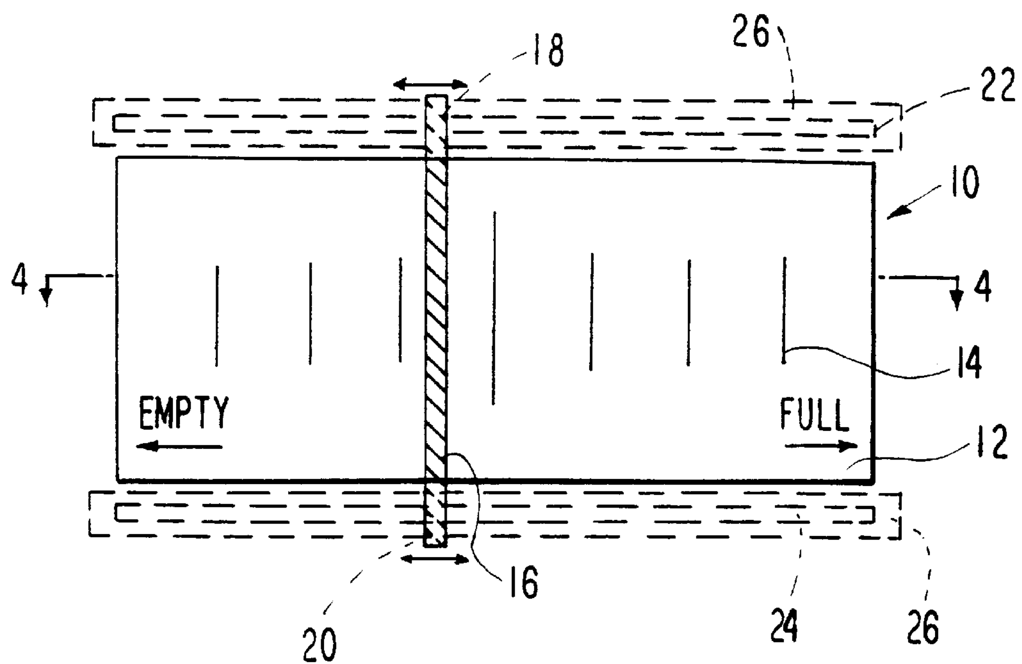
FIG. 3 is a plan view of a visual disk-capacity indicator according to an embodiment of the present invention.

FIG. 3 shows a plan view of a visual disk-capacity indicator 10 according to the embodiment of FIG. 2. A window 12 made from a transparent material provides visual access to an indicator needle 16 below. The window includes indicia 14 showing various capacity levels ranging from empty to full. The indicator needle 16 is slidably engaged with a guide rail 22.

Figure 4:
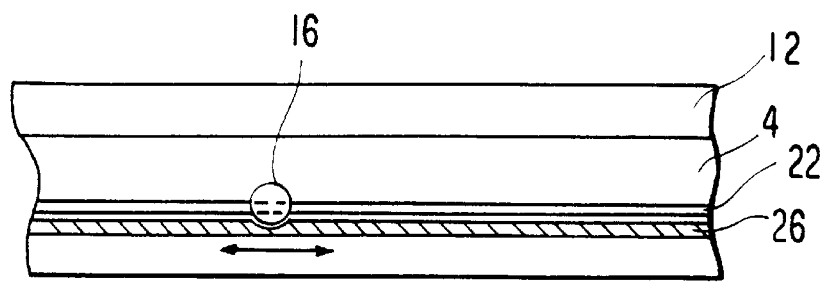
FIG. 4 is a cross-sectional view taken along line 4—4 of FIG. 3.

FIG. 4 is a cross-sectional view of a portion of the visual disk-capacity indicator 10 taken along line 4—4 of FIG. 3. According to a preferred embodiment, the indicator needle 16 has a first end 18 slidably engaged with the guide rail 22 and a second end 20 slidably engaged with a second guide rail 24 to maintain the indicator needle 16 in a parallel relation with the indicia 14.

The indicator needle 16 may be positioned to show disk capacity by a variety of methods. For example, a positioning arm (not shown) extending from the disk drive in which the floppy disk 1 is inserted may be used to move the indicator needle 16 by engaging and moving the first end 18 closest to the access opening 4, with the second end 20 sliding along with the first end 18. The indicator needle 16 is prevented from arbitrarily sliding on the guide rails 22, 24 by friction from a lint-free cloth 26 located below the indicator needle 16 and gently contacting the indicator needle 16.

Alternatively, the indicator needle 16 may be positioned using magnetic means (not shown). For example, the second end 20 of the indicator needle 16, or the end closest to the recording medium 2, may include a ferromagnetic material that moves in response to an induced magnetic field from an electromagnetic device controlled by the disk drive unit. The disk drive unit energizes the electromagnetic device to pick up the indicator needle 16 and de-energizes the electromagnetic device when the indicator needle 16 is at a position indicating a current disk capacity. The electromagnetic device need not extend into the cartridge 3 through the access opening 4 but instead may provide a sufficient localized magnetic field to move the indicator needle 16 from outside of the cartridge 3. The electromagnetic device can be located on the same arm as the magnetic recording head of the disk drive unit. Alternatively, the magnetic recording head itself may serve as the electromagnetic device for positioning the indicator needle 16.

According to a preferred embodiment, after the magnetic recording head performs an operation of recording or erasing data to or from the recording medium 2, the magnetic recording head is then used to position the indicator needle 16 by generating a magnetic field to engage the indicator needle 16, moving the indicator needle 16 to a position reflecting the available recording capacity of the recording medium 2, and removing the magnetic field to disengage the indicator needle 16.

Figure 5:
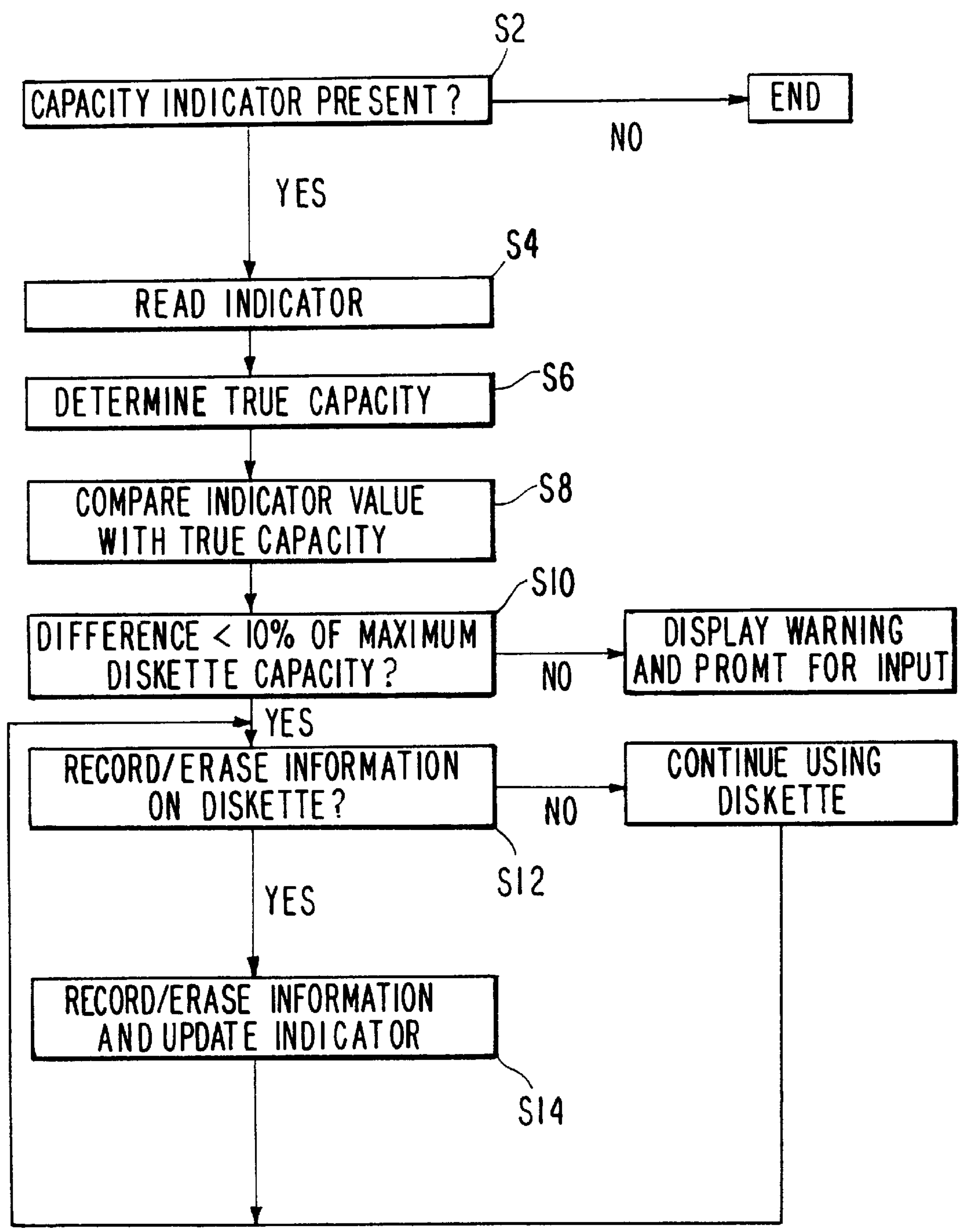
FIG. 5 is a chart showing a method of updating a visual disk-capacity indicator according to an embodiment of the present invention.

FIG. 5 shows a flow chart of a method for updating a visual disk-capacity indicator according to an embodiment of the present invention. First, when the disk drive unit of a computer initially accesses a floppy disk inserted therein, it is determined whether a visual disk-capacity indicator is present at S2. If the answer is no, the floppy disk is used as a conventional floppy disk without a visual disk-capacity indicator. If the answer is yes, an indicated capacity on the visual disk-capacity indicator is read at S4, and then the recording medium 2 is scanned to determine its true capacity at S6. At S8, a comparison is made between the indicated capacity and the true capacity and, at S10, it is determined whether a difference between the indicated capacity and true capacity is less than 10% of the maximum capacity of the recording medium. If the answer is no, a warning regarding the discrepancy is displayed on a monitor of the computer, and a prompt for more information is also displayed. If the answer is yes, it is determined whether a record and/or erase operation has been performed at S12. If a record and/or erase operation has been performed, the visual disk-capacity indicator position is updated at S14. If no record and/or erase operation has been performed, the diskette performs as a conventional one, such as reproducing recorded data, for example, and the visual disk-capacity indicator position is not updated until a record and/or erase operation is performed.

The embodiment described above is an illustrative example of the present invention and it should not be construed that the present invention is limited to those particular embodiments. Various changes and modifications may be effected by one skilled in the art without departing from the spirit or scope of the invention as defined in the appended claims. For example, the access opening 4 and the visual disk-capacity indicator 10 need not be located towards the peripheral edge of the cartridge 3 where the cover plate 6 is located but instead may be located elsewhere on the cartridge 3. Also, because an access opening is not necessary if an electromagnetic device is used to move the indicator needle 16, the cartridge 3 need not contain an access opening.

What is claimed is:

1. A visual disk-capacity indicator for a cartridge and a disk recording medium used in a disk recording system, the disk-capacity indicator comprising:

a transparent window formed in the cartridge containing the disk recording medium;

indicia located on the window and representing capacity levels of the disk recording medium ranging from empty to full;

a longitudinal guide rail attached to the cartridge; and an indicator needle for indicating an approximate amount of disk space available on the recording medium, the indicator needle being visible through the window and slidably engaged with the longitudinal guide rail, wherein the indicator needle is arranged to have a longitudinal axis thereof substantially parallel with the indicia.

2. A floppy disk cartridge, comprising:

a rigid housing for containing a floppy disk recording medium therein;

a cover plate located at a peripheral edge of the housing for selectively covering an aperture formed in the housing and providing access to a portion of the recording medium contained in the housing, the cover plate being slidable with respect to the housing;

a spring mechanism for biasing the cover plate to a normally closed position covering the aperture formed in the housing, the spring mechanism located in the housing on a side of the cover plate and proximate the peripheral edge whereat the cover plate is located;

a visual disk-capacity indicator for indicating an approximate amount of disk space available for recording data on the recording medium, the disk-capacity indicator located in the housing on a side of the cover plate opposite to the spring mechanism and proximate the peripheral edge whereat the cover plate is located, the disk-capacity indicator being visible through a transparent window in the housing for viewing an indicator needle positioned to indicate an approximate amount of disk space available for recording on the recording medium; and an access opening located proximate the disk-capacity indicator at the peripheral edge of the housing whereat the cover plate is located for providing access to position the indicator needle.

3. A floppy disk cartridge according to claim 2, wherein the indicator needle of the disk-capacity indicator contains a ferromagnetic material so that the indicator needle is positionable using an electromagnetic device.

4. A floppy disk cartridge, comprising:

a rigid housing for containing a floppy disk recording medium therein;

a cover plate located at a peripheral edge of the housing for selectively covering an aperture formed in the housing and providing access to a portion of the recording medium contained in the housing, the cover plate being slidable with respect to the housing;

a spring mechanism for biasing the cover plate to a normally closed position covering the aperture formed in the housing, the spring mechanism located in the housing on a side of the cover plate and proximate the peripheral edge whereat the cover plate is located; and a visual disk-capacity indicator for indicating an approximate amount of disk space available for recording data on the recording medium, the disk-capacity indicator located in the housing on a side of the cover plate opposite to the spring mechanism and proximate the peripheral edge whereat the cover plate is located, the disk-capacity indicator being visible through a transparent window in the housing for viewing an indicator needle positioned to indicate an approximate amount of disk space available for recording on the recording medium, wherein the visual disk-capacity indicator comprises:

a first guide rail slidably engaged with a first end of the indicator needle;

a second guide rail slidably engaged with a second end of the indicator needle; and a lint-free cloth gently contacting the indicator needle for providing friction to prevent the indicator needle from arbitrarily sliding along the first and second guide rails.

5. A method for indicating disk capacity on a visual disk-capacity indicator of a floppy disk, the method comprising the steps of:

recording data on or erasing data from the floppy disk; and moving an indicator needle of a visual disk-capacity indicator of the floppy disk to a position that reflects an approximate amount of disk space available for recording on the floppy disk by engaging the indicator needle with an external arm and laterally sliding the indicator needle along a longitudinal guide rail to the position that reflects the approximate amount of disk space available.

6. A method according to claim 5, wherein the indicator needle contains a ferromagnetic material, and the step of moving includes engaging the indicator needle with an electromagnetic device to magnetically move the indicator needle to the position that reflects the approximate amount of disk space available.

* * * * *